United States Patent [19]

Paice

[11] Patent Number: 4,719,398

[45] Date of Patent: Jan. 12, 1988

[54] COASTING AC MOTOR RESTART SYSTEM AND METHOD

[75] Inventor: Derek A. Paice, Palm Harbor, Fla.

[73] Assignee: Westinghouse Electric Corp., Pittsburgh, Pa.

[21] Appl. No.: 871,979

[22] Filed: Jun. 9, 1986

[51] Int. Cl.$^4$ ............................................. H02P 1/26
[52] U.S. Cl. .................................. 318/778; 318/798; 318/806
[58] Field of Search ......... 318/778, 806, 798, 807–811

[56] References Cited

U.S. PATENT DOCUMENTS

| | | | |
|---|---|---|---|
| 4,409,533 | 10/1983 | Kawabata | 318/778 |
| 4,417,193 | 11/1983 | Hirata | 318/806 |
| 4,451,112 | 5/1984 | Hattori et al. | 318/778 |
| 4,607,205 | 8/1986 | Kito | 318/778 |

Primary Examiner—David Smith, Jr.
Attorney, Agent, or Firm—C. M. Lorin

[57] ABSTRACT

A variable frequency adjustable speed motor drive allows restart of a spinning induction motor by initially increasing the frequency of the associated inverter while keeping the DC voltage source thereof low, then by decreasing the frequency of the inverter while monitoring the effective motor impedance $V_{DC}/I_{DC}$ or $V_{AC}/I_{AC}$ until the latter jumps at an initial level indicating matching of the frequency with the motor spinning speed. Thereafter, the DC voltage is restored in magnitude and the inverter is increased in frequency to match the desired motor speed.

4 Claims, 3 Drawing Figures

COASTING AC MOTOR RESTART SYSTEM AND METHOD

BACKGROUND OF THE INVENTION

The present invention relates to starting of an AC motor which is already coasting. This occurrence may be the result of a short power failure where the motor has a large moment of inertia. An immediate restart is desired upon return of the power so that the motor can be reaccelerated from its coasting speed up to the operative speed.

In contrast, conventional adjustable frequency drives are designed to start with the induction motor at rest. During acceleration, the appropriate volts-per-hertz is maintained from the low frequency and the system is slowly accelerated up to desired speed. The motor slip remains small and large motor currents do not occur. However, where the motor load has a large inertia and the motor has been suddenly stopped, it continues spinning. Therefore, a restart of the motor by turning the inverter ON, for instance where the motor stoppage was due to a short outage in the power and the latter is restored, raises a problem. When the inverter is turned ON, the actual inverter frequency and the frequency required for the motor spinning speed, will not match. Therefore, the motor has a large slip. Under the circumstance, as the inverter voltage and frequencies in the starting sequence are increasing slowly, large currents will flow and the inverter will trip. One solution has been to hold the inverter output at a low value for a period of time, and and to allow the motor and load to decelerate almost to a standstill. In many applications, though, it is desirable to be able to restart the motor as soon as possible. To do this, it is necessary to find how to match the inverter frequency with the spinning speed of the motor. This has been done with information derived from a tachometer measuring the shaft speed, hence the required starting frequency for the inverter. This solution requires the use of sensors on the motor.

In contrast, the present invention does not require the addition of sensors on the motor and it enables to restart the motor drive at any frequency including standstill.

SUMMARY OF THE INVENTION

Restarting of a spinning AC motor is initiated by reducing the AC voltage applied to the motor to a predetermined minimum level while bringing the frequency of the motor AC input to a predetermined high level of frequency.

The restarting process is performed from such initial conditions by reducing progressively the frequency of the motor AC input until it matches the motor spinning speed. The motor is, thereafter, brought back to operative speed from such matching speed under a restored voltage on the AC input of the motor. Matching of the AC motor input frequency with the spinning speed is detected by measuring the voltage to current ratio ahead of the motor as a characteristic of the motor slip.

In a motor drive including AC/DC converter, DC-link and an inverter, the ratio $V_{DC}/I_{DC}$ in the DC link is used as an indication of the slip. In such case, while the DC-link voltage is held at a minimum in the process, the DC-link current is used as motor slip detecting signal to stop reducing the frequency and initiate speed ramping up with a restored DC link voltage. Control of the frequency of the AC motor input is effected by controlling the inverter.

DETAILED DESCRIPTION OF THE INVENTION

Figure 1:
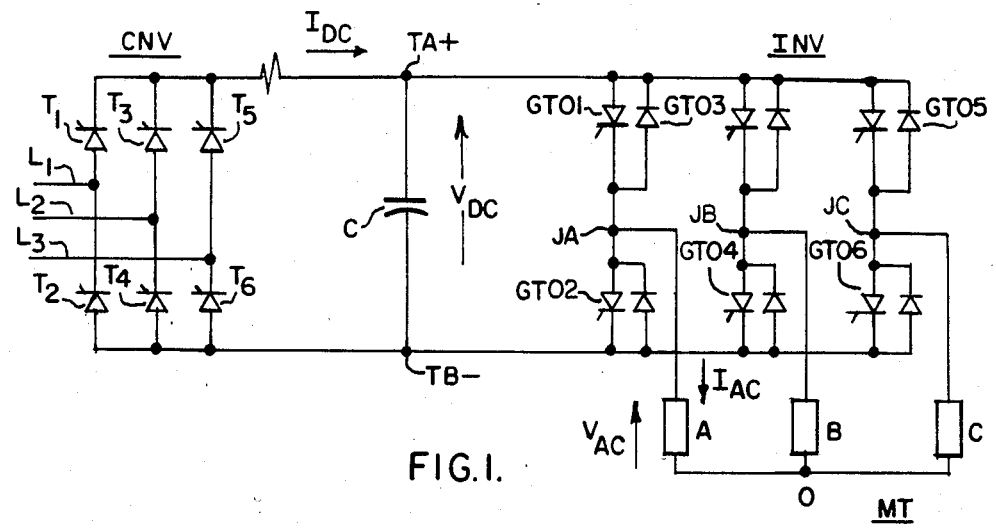
FIG. 1 is a basic GTO inverter illustrating the choice of parameters in detecting when the inverter frequency is matching the motor spinning frequency, according to the present invention.

Referring to FIG. 1 a variable speed motor drive is illustrated comprising a converter CNV, a DC-link, an inverter INV and a motor MT. From the industrial network (L1, L2, L3) AC power is applied to a converter CNV consisting of a thyristor bridge T1-T6. The DC voltage generated on terminals (TA, TB) across a capacitor C is applied to the GTO bridge of an inverter INV including three poles connected across the DC terminals about nodes JA, JB, JC for the respective motor phases (A, B, C) which are star-connected about a neutral point O. As explained hereinafter, the present invention proposes, as control parameters in detecting the matching frequency of the inverter with the spinning speed of the motor, either measuring $V_{DC}$ across capacitor C and $I_{DC}$ the current in the DC link, or measuring $V_{AC}$ across the phases (A, B or C) and $I_{AC}$ the current flowing in any of these phases. More generally, the voltage to current ratio of the inverter in operation is measured, while the motor is spinning.

Figure 2:
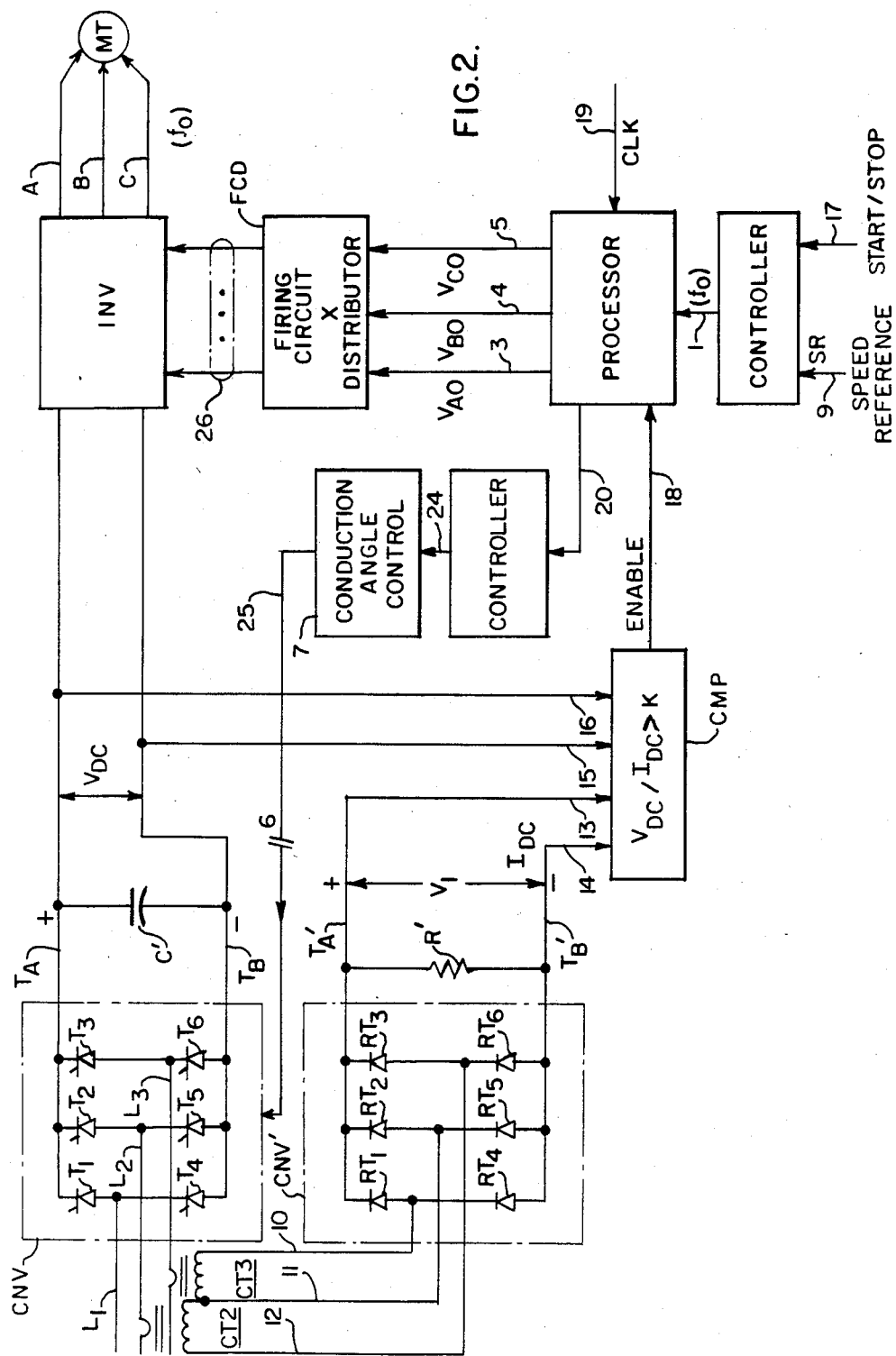
FIG. 2 is a block diagram illustrating the preferred embodiment of the coasting AC motor restart system according to the present invention.

Referring to FIG. 2, the invention will now be described in its preferred embodiment. As in FIG. 1, the motor MT is supplied with AC power from an inverter INV responding to a DC link sustained by a converter CNV. For the purpose of disclosing a motor drive of the type shown in FIGS. 1 and 2, reference is made to: "Application of Gate-Turn-OFF Thyristors in 460 V, 7S-250 HP AC Motor Drives" by D. A. Paice and K. E. Mattern in IEEE 1982 IAS82 pp. 663-669. This publication is hereby incorporated by reference. Also, with regard to the description of a microprocessor-based AC motor drive control as shown in FIG. 2, reference is made to: "Microprocessor-Based Control of an AC Motor Drive" by C. W. Edwards in IEEE 1982 IAS82 pp. 452-456. This second publication is hereby incorporated by reference. For the purpose of disclosing a microprocessor-based start system for an induction motor drive, copending patent application Ser. No. 858,131; filed Apr. 30, 1986 and entitled "Multifunction Control System for an Induction Motor Drive", is hereby incorporated by reference.

In FIG. 2 the derivation of a signal $V_1$ representative of the current $I_{DC}$ drawn through the converter CNV into the DC-link, is shown through the use of a side converter CNV' consisting in a bridge of rectifiers RT1-RT6 mounted across DC terminals (TA', TB'). This method of deriving a signal representative of $I_{DC}$ without sensing in the DC link is known. See for instance U.S. Pat. No. 3,713,012. The inverter is shown in FIG. 2 controlled by a controller via a processor PR.

The invention will now be described specifically by reference to FIG. 2 in the context of the afore-stated prior art.

The DC-link voltage $V_{DC}$ is sensed from lines 15 and 16, and the $I_{DC}$ DC current representative signal is derived from lines 13 and 14. A comparator CMP determines whether the ratio $V_{DC}/I_{DC}$ has become larger than a critical level K. When this occurs, an ENABLE signal is applied by line 18 to the processor. The motor is assumed to be spinning when, following a short outage causing the inverter INV to be cut-off, power is restored and the system is to be restarted (line 17 to the controller). The problem is to find the initial frequency of the inverter which matches the spinning speed.

Figure 3:
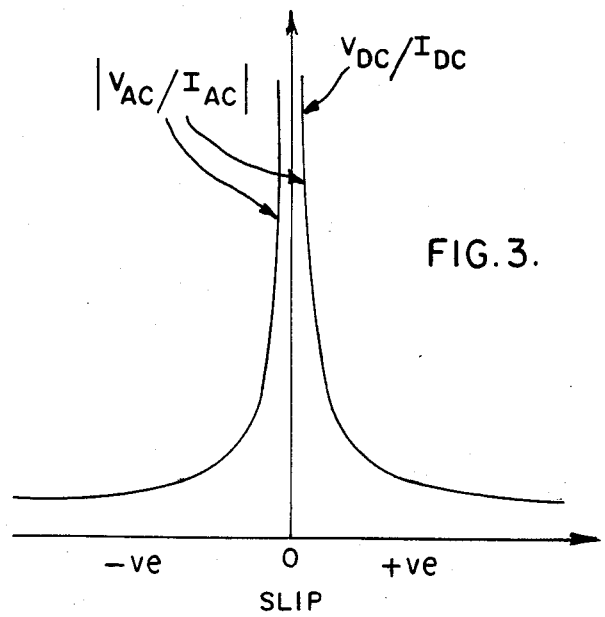
FIG. 3 is a curve illustrating for both directions of rotation the critical magnitude of the detected signal according to the invention when AC input frequency is matching the spinning speed.

Referring to FIG. 3, the slip of the motor, is:

$$s = (f_{inv} - f_m)/f_{inv}$$

where $f_{inv}$ = inverter frequency and
$f_m$ = motor spinning frequency

It is represented varying from $+v_e$ to $-v_e$ when the frequency of the inverter decreases from very high to a low value and reaches the value $f_m$. The curve of FIG. 3 shows that when $f_{inv}$ goes through the value $f_m$ the ratio $|V_{DC}/I_{DC}|$ sharply increases to an infinite level. Accordingly, comparator CMP (FIG. 2) will easily detect the critical passage through $f_m$ when the frequency of the inverter is varied downwardly.

The method according to the present invention consists in first setting the inverter to operate at the highest operating frequency. However, concurrently therewith, the DC-link voltage is much reduced, thereby reducing the AC input voltage to the motor, so as to prevent excessive current therethrough. These steps are performed by the processor, causing by line 20 a voltage regulator 6 to control by line 24 the conduction angle controller 7 of converter CNV. Lines 25 from block 7 are applied to the several thyristors T1–T6 of the converter. Retarding the firing angle of the thyristors will reduce the voltage $V_{DC}$ across capacitor C of the DC link, as generally known. Processor PR causes the firing circuit FCD to ramp-up the inverter in frequency, up to a relatively high speed reference set on line 9.

Following the afore-stated two initial steps, processor PR causes the firing circuit FCD to ramp-down slowly the inverter in frequency. This is achieved typically at 10 Hz/s while holding at 10% the normal ratio volts-per-hertz. Concurrently, comparator CMP is monitoring the ratio $V_{DC}/I_{DC}$. When the critical level K (FIG. 3) has been detected, the ramp-down effect on the inverter is cancelled. The processor is appraised of the fact, and by line 20 the voltage regulator is caused to restore the DC-link voltage $V_{DC}$ to its normal level, while the inverter is caused to ramp-up to the assigned operative frequency.

In practice, once matching of the inverter frequency with the spinning motor speed has been detected, the motor having then begun to regenerate, the frequency is held constant while the DC-link voltage is being restored to normal. This is the "acquire mode", which lasts about 500 ms. Also, before starting the search by deceleration from the highest frequency, the deceleration rate is initially held at only 1 Hz/s while monitoring by comparator CMP is held inoperative. This delay is just enough to allow the DC-link regulator to settle before actually beginning the search. The processor, thus, distinguishes a first and a second submode in the "search mode", which is to be followed by the "acquire mode".

The restart sequence is enabled by closing a switch on the processor board. Once the restart sequence from line 17 has been enabled, the four following basic operative modes are successively performed:

(1) normal mode-
(2) reset mode-
(3) search mode-
(4) acquire mode-

The reset mode involves increasing the inverter frequency to maximum with a low DC-link voltage, even zero volts, being established.

In the search mode the inverter frequency is preferably decelerated first at 1 Hz/s to allow settling of the DC link regulator. Then at 10 Hz/s deceleration at 10 Hz/s allows searching.

The acquire mode occurs when the detection has been achieved. The frequency is, then, held constant and the DC-link voltage is restored. 500 ms thereafter acceleration in the normal mode is allowed.

During the preset, search and acquire modes, a standby condition is flashed on the status panel, in order to warn the operator that the processor is functioning normally, thus, that the drive is not malfunctioning. The four modes are numbered zero (normal) and one through three (the latter being for the acquire mode) The variable which stores the mode number is called CM MODE.

There are three times associated with the respective functions. A first counter CNTR4 determines the preset time.

During the preset interval, the acceleration is set to 480 Hz/s (the highest possible value) for 64 main program loop periods. Since the main loop takes approximately 7 ms to execute, the preset interval will last about 450 ms.

A second timer CNTR5 is used to control the delay which allows the DC link voltage regulator to settle. The delay lasts 127 main program loops, thus, about 900 ms. A third timer CNTR6 is used to establish a delay of 80 main program loops, that is 450 ms for the acquire time.

A counter (BCNTR) is used to determine the blink rate, indicating the standby status during spinning speed search.

In the preferred embodiment, instead of looking for the ratio $V_{DC}/I_{DC}$ with the comparator, since $V_{DC}$ has been established at a minimum value, searching involves only monitoring discontinuity occurring when the DC-link current is going through zero.

It is observed that, instead of using $V_{DC}/I_{DC}$, the search mode can be conducted with the ratio $|V_{AC}I_{AC}|$ as the parameter.

It appears that the coasting motor search operation sequence according to the present invention may be performed even for a "conventional" start, whereby no special design is necessary to distinguish between a normal start and a coasting motor restart.

To summarize: The following steps are performed by the microprocessor associated with the motor drive:

MICROPROCESSOR

Actions to start into spinning motor
At start set $V_{DC}$ to near zero
Set acceleration to a very high value
Set inverter frequency to maximum speed Set inverter output to a fixed low voltage (typically 10% volts/Hz)
Reset acceleration to normal
Set deceleration to a nominal 10 Hz/second
Set frequency command to zero and start search
When DC link current goes below a user selectable value: stop search (typical 1 to 16% rated)
Set frequency command to present frequency
Have voltage to normal
Wait some time (typically 0.5 seconds) for transients to decay
Set the deceleration rate back to normal

I claim:

1. In a coasting AC motor restart system for a variable frequency adjustable speed AC motor drive including a voltage-controlled AC/DC converter providing a voltage source of adjustable DC voltage, an inverter controlled in frequency and responsive to said voltage source, and an AC motor energized by said inverter; the combination of:

first means operable on said converter to reduce said DC voltage;

second means responsive to said first means and operable on said inverter for raising the frequency thereof to a predetermined high level at a fast rate;

voltage measuring means for driving a voltage signal representative of a voltage applied across said inverter;

current measuring means for driving a current signal representative of a current flowing under said voltage between the voltage source and the motor;

divider means for establishing the ratio between said voltage signal and said current signal;

means for decelerating said inverter in frequency at a predetermined search rate from said high level;

means for detecting a discontinuity in said ratio under operation of said decelerating means; and means for controlling the speed of said motor from an initial frequency of said inverter matching the occurrence of said discontinuity.

2. A method of restarting a coasting AC motor supplied with AC power by a frequency controlled inverter having a controllable DC voltage source associated therewith, comprising the steps of:

initially reducing the AC voltage applied to the motor and concurrently increasing the frequency of the inverter to a predetermined high level;

reducing the frequency of the inverter at a predetermined rate;

measuring the voltage across the inverter to derive a voltage representative signal and concurrently measuring the current flowing from the voltage source to the motor to derive a current representative signal; both of said measuring steps being performed concurrently with said inverter frequency reducing step;

establishing continuously the ratio of said voltage signal to said current signal until the established ratio exhibits a discontinuity; and initiating control of the speed of the motor by controlling the frequency of the inverter upward while increasing said AC voltage upon the occurrence of said discontinuity.

3. The method of claim 2 with said current signal being measured by deriving a signal representative of the DC current drawn from said DC voltage source into said inverter and with said voltage signal being measured by deriving a signal representative of the voltage source DC voltage.

4. The system of claim 1 with said voltage measuring means being applied across the voltage source to derive a voltage signal representative of the DC voltage; and with said current measuring means being applied between the voltage source and the inverter to derive a current signal representative of the DC current supplied therebetween.

* * * * *